United States Patent
Renner (10) Patent No.: US 11,504,998 B2
(45) Date of Patent: Nov. 22, 2022

(54) WHEEL MADE OUT OF FIBER REINFORCED MATERIAL AND PROCEDURE TO MAKE SUCH WHEEL

(71) Applicant: MUBEA CARBO TECH GMBH, Salzburg (AT)

(72) Inventor: Christoph Renner, Gosau (AT)

(73) Assignee: MUBEA CARBO TECH GMBH, Salzburg (AT)

( * ) Notice: Subject to any disclaimer, the term of this patent is extended or adjusted under 35 U.S.C. 154(b) by 639 days.

(21) Appl. No.: 16/341,843

(22) PCT Filed: Oct. 4, 2017

(86) PCT No.: PCT/EP2017/075219
§ 371 (c)(1),
(2) Date: Apr. 12, 2019

(87) PCT Pub. No.: WO2018/073005
PCT Pub. Date: Apr. 26, 2018

(65) Prior Publication Data
US 2019/0315157 A1   Oct. 17, 2019

(30) Foreign Application Priority Data

Oct. 17, 2016 (CH) .................................... 01383/16
Feb. 17, 2017 (CH) .................................... 00185/17
Mar. 17, 2017 (CH) .................................... 00329/17

(51) Int. Cl.
*B60B 5/02* (2006.01)
*B60B 1/12* (2006.01)
(Continued)

(52) U.S. Cl.
CPC .................. *B60B 5/02* (2013.01); *B60B 1/12* (2013.01); *B60B 27/0073* (2013.01);
(Continued)

(58) Field of Classification Search
CPC ......... B60B 5/02; B60B 1/12; B60B 27/0073; B60B 2310/318
See application file for complete search history.

(56) References Cited

U.S. PATENT DOCUMENTS 372,129 A * 10/1887 Davison .................... B60B 1/12
                                                               301/67
848,461 A *  3/1907 Hadley ..................... B60B 1/12
                                                               301/67
(Continued)

FOREIGN PATENT DOCUMENTS

DE    35 36 308 A1    4/1987
DE    36 37 214 A1    5/1988
(Continued)

OTHER PUBLICATIONS

Japanese Patent Office, English language version of the Office Action for Japanese Application No. 2019-520354, dated May 19, 2020 (9 pages).
(Continued)

*Primary Examiner* — Scott A Browne
(74) *Attorney, Agent, or Firm* — Pauley Erickson & Swanson (57) ABSTRACT

A wheel (1) includes a rim (2) and a wheel center (3) made from a fiber reinforced composite material. The wheel center (3) includes a tubular middle section (6) having a center opening (7) extending in the direction of a wheel axis (19) and having a first and a second end (8, 9). A hub (5) includes a first flange ring (10) and a second flange ring (11). At least one of the flange rings (10, 11) and the tubular middle section (6) are interconnected to each other by a form fit interconnection (12, 13).

17 Claims, 8 Drawing Sheets

(51) Int. Cl.
    *B60B 27/00* (2006.01)
    *B29C 70/28* (2006.01)
    *B29K 307/04* (2006.01)
    *B29L 31/32* (2006.01)

(52) U.S. Cl.
    CPC .......... *B29C 70/28* (2013.01); *B29K 2307/04* (2013.01); *B29L 2031/322* (2013.01); *B60B 2310/204* (2013.01); *B60B 2310/318* (2013.01); *B60B 2310/52* (2013.01); *B60B 2360/341* (2013.01); *B60Y 2200/12* (2013.01)

(56) References Cited

U.S. PATENT DOCUMENTS

| | | | |
|---|---|---|---|
| 5,018,795 A | | 5/1991 | Engerand et al. |
| 5,234,259 A | * | 8/1993 | Nishimuro ................ B60B 5/02 |
| | | | 301/11.1 |
| 5,246,275 A | | 9/1993 | Arredondo, Jr. |
| 5,820,224 A | * | 10/1998 | Dimatteo, Jr. .......... B60B 1/044 |
| | | | 301/35.58 |
| 2008/0303337 A1 | | 12/2008 | Krantz |
| 2012/0212037 A1 | * | 8/2012 | Bohrmann .............. B60B 3/147 |
| | | | 301/64.702 |

FOREIGN PATENT DOCUMENTS

| | | |
|---|---|---|
| EP | 0 381 558 A1 | 8/1990 |
| EP | 2 719 548 A1 | 4/2014 |
| EP | 2 848 426 A1 | 3/2015 |
| JP | 2001-504056 A | 3/2001 |
| TW | 201141720 A1 | 12/2011 |
| WO | WO-9301930 A1 * 2/1993 ............... B60B 5/02 |
| WO | WO 2013/083500 A1 | 6/2013 |
| WO | WO 2013/083729 A2 | 6/2013 |
| WO | WO 2015/028337 A1 | 3/2015 |

OTHER PUBLICATIONS

European Patent Office, English language version of the International Search Report, Form PCT/ISA/210 for Int'l Appln PCT/EP2017/075219, dated Dec. 11, 2017 (3 pages).

European Patent Office, English language version of the Written Opinion of the International Searching Authority, Form PCT/ISA/237 for Int'l Appln PCT/EP2017/075219, dated Dec. 11, 2017 (5 pages).

* cited by examiner

WHEEL MADE OUT OF FIBER REINFORCED MATERIAL AND PROCEDURE TO MAKE SUCH WHEEL

BACKGROUND OF THE INVENTION

Field of the Invention

The invention lies in the field of wheels made out of fiber-reinforced material for passenger vehicles such as cars, motorcycles, etc.

Discussion of Related Art

WO13083729 published on 22 Aug. 2013 in the name of the same applicant relates to a wheel which comprises a rim and a thereto-connected spoke structure that is made out of fiber reinforced plastic material. An insert is embedded in the fiber-reinforced material at the center of the spoke structure. The insert protrudes in at least one region above the surface of the fiber reinforced plastic material forming at least one contact area.

WO15028337 published on 5 Mar. 2015 in the name of the same applicant relates to a wheel comprising a rim and a wheel center. The wheel center comprises an insert, which comprises a front pad and a rear pad which are a distance apart with respect to each other and which are at least partially embedded in a composite material.

TW201141720 published on 11 Feb. 2013 in the name of Chang Yu Cheng is directed to a motorcycle wheel that is made of composite fiber. The wheel includes a solid circular rim and a hollow supporting portion. The circular rim includes an outer rim and an inner rim. The outer rim has a circular groove. The inner rim has a hole. The inner rim connects with the supporting portion by which is located in the hole of the inner rim.

WO13083500 published on 13 Jun. 2013 is directed to a wheel. The wheel comprises a rim and a wheel spider. The wheel spider has a hub and spokes. The wheel includes spokes including one or more linearly stretched textile strands as reinforcement material of a fiber composite and each linearly stretched textile strand runs at least once from the rim to the hub and back without interruption and thus forms at least one spoke.

SUMMARY OF THE INVENTION

The hub of wheels having a rim and wheel center made out of fiber reinforced composite material (composite material) often comprise an insert made from a metallic material which is encompassed by the composite material. During production, the insert is normally arranged in the mold at least partially embedded in the fibers of the reinforced plastic material. It is connected to the composite material when the composite material cures. The hub is important for secure operation of the wheel. It provides the adapter by which the wheel can be connected to an axle of a vehicle. In addition, it prevents contact corrosion and is responsible to transfer large forces between the axle of the vehicle and the rim across the wheel center. Often the known solutions do not sufficiently take care of thermal stress. In addition, they do not offer a failsafe behavior in the case of a faulty condition.

One aim of the invention is to provide a wheel and a process for making of a wheel that offers an improved transfer of forces during the lifetime of the wheel. The invention further offers the advantage that the impact of the thermal stress can be reduced. In addition, the invention offers the ability that the failsafe behavior of the wheels can be improved.

One embodiment of a wheel according to the invention comprises a rim and a thereto-attached wheel center that comprises a tubular middle section made from composite material, e.g. carbon fibers and/or other fibers embedded in a polymeric matrix, having a center opening extending in the direction of a wheel axis and having a first and a second end. A hub comprises a first and a second flange ring. The first flange ring is attached to the first end of the tubular middle section and the second flange ring is attached to the second end of the tubular middle section. At least one of the flange rings and the tubular middle section are mechanically interconnected to each other by a form fit interconnection in a distortion safe manner. In a preferred variation the at least one form fit interconnection between at least one flange ring and the tubular middle section is arranged at least partially on the inside of the center opening. Good results can be achieved when the at least one form fit interconnection is arranged adjacent to at least one end of the center opening. The at least one form fit interconnection may comprise one or several tapered surfaces interacting with each other. The at least one tapered surface can be of advantage namely with respect to making of the tubular middle section as it can prevent mechanical processing of the fibers. Furthermore, the precision and durance can be positively influenced. The taper angle of the tapered surface is preferably in the range of 1° to 10° depending on the field of application. At least one form fit interconnection, comprises at least one first undercut arranged at the tubular middle section interacting in a mounted position with at least one second undercut arranged at a flange ring, in circumferential direction. In a preferred variation at least one of the flange rings, is interconnected to the tubular middle section by a layer of adhesive. At least one of the flange ring may comprise a shoulder by which the flange ring is supported with respect to the dedicated end, of the tubular middle section in the direction of the wheel axis. If appropriate, the first and the second flange ring may be directly or indirectly interconnected to each other. E.g., the first and the second flange ring are directly connected to each other by a first and a second thread. Alternatively or in addition, the first and the second flange ring are interconnected to each other indirectly by a sleeve and/or by other mechanical connection means, such as bolts. The sleeve can be interconnected to at least one flange ring by a thread connection comprising a first and a second thread. The sleeve may comprise a drive connection to fasten the sleeve with respect to the first and/or the second flange ring. Good results can e.g. be achieved by a hexagonal drive connection or a similar means. The threads on either side of the sleeve are having opposite turning directions such that turning of the sleeve in one direction results in fastening both opposite thread arrangements.

A method for making of a wheel according to the invention may comprise the following method steps:

(a) Providing at least one auxiliary body corresponding at least partially to the inside of at least one hollow spoke;

(b) Providing a mold comprising a cavity corresponding at least partially to the outside of the wheel;

(c) Applying of reinforcing fibers to the auxiliary body and/or the cavity to form the wheel center;

(d) Inserting the at least one auxiliary body and the reinforcing fibers into the cavity of the mold;

(e) Closing the mold and applying and/or curing a matrix material in which the reinforcing fibers are embedded;

(f) Removing the wheel center—and if appropriate the thereto attached rim if formed in the same step—from the mold;

(g) Removing the at least one auxiliary body from the hollow spoke across the opening through the center opening (7) of the wheel center (3).

If appropriate, the auxiliary body may be used to form at least part of the inside of the hollow spokes and the center opening of the tubular middle section. This offers the advantage to build very lightweight and robust wheels.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings, which should not be considered limiting to the invention described in the appended claims.

The drawings are showing.

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
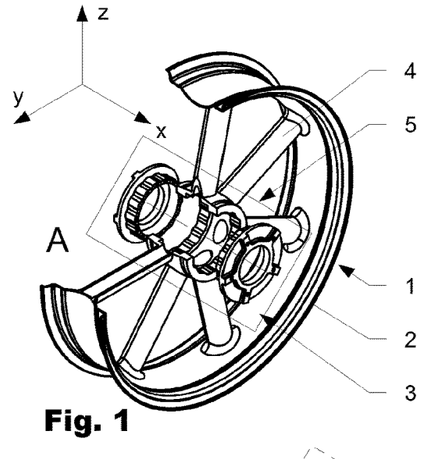
FIG. 1 is a cutaway perspective view of a first variation of a wheel according to the invention.
Figure 2:
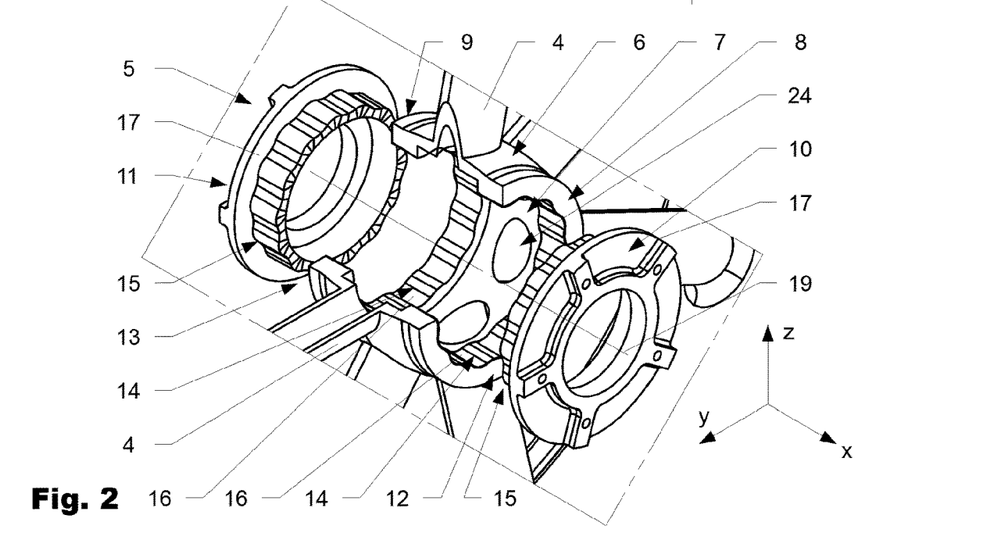
FIG. 2 is a magnified exploded view of the first variation of the wheel shown at detail A of FIG. 1.
Figure 3:
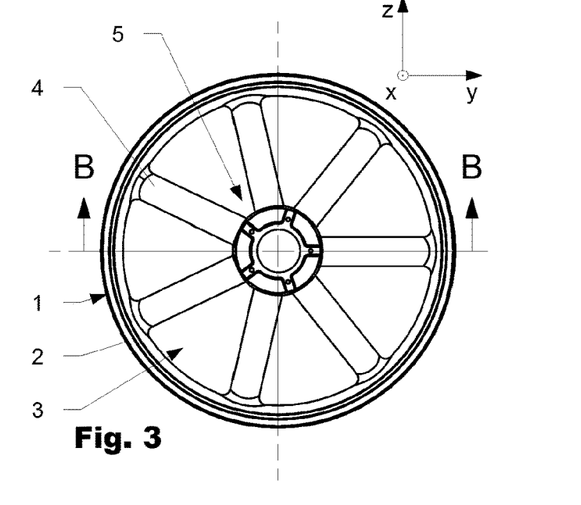
FIG. 3 is a front view of the first variation of the wheel shown in FIG. 1.
Figure 4:
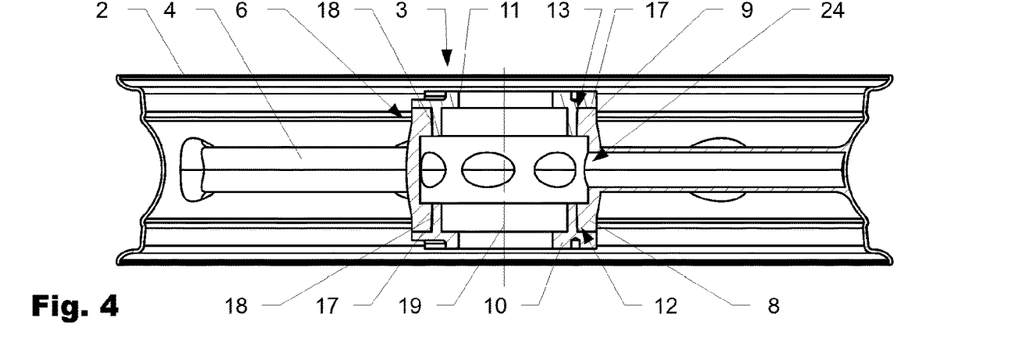
FIG. 4 is a side cross-sectional view along Section B-B shown in FIG. 3.

FIG. 1 is showing a first variation of a wheel 1 according to the invention in a perspective view in a partially cut manner. FIG. 2 is showing detail A of FIG. 1 in a magnified manner. FIG. 3 is showing the wheel 1 in a front view and FIG. 4 is showing section BB of FIG. 3.

Figure 5:
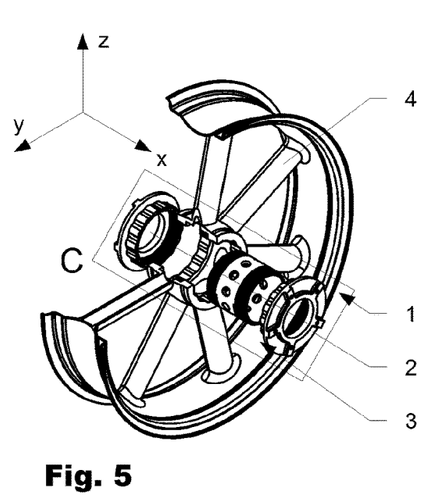
FIG. 5 is a cutaway perspective view of a second variation of a wheel according to the invention.
Figure 6:
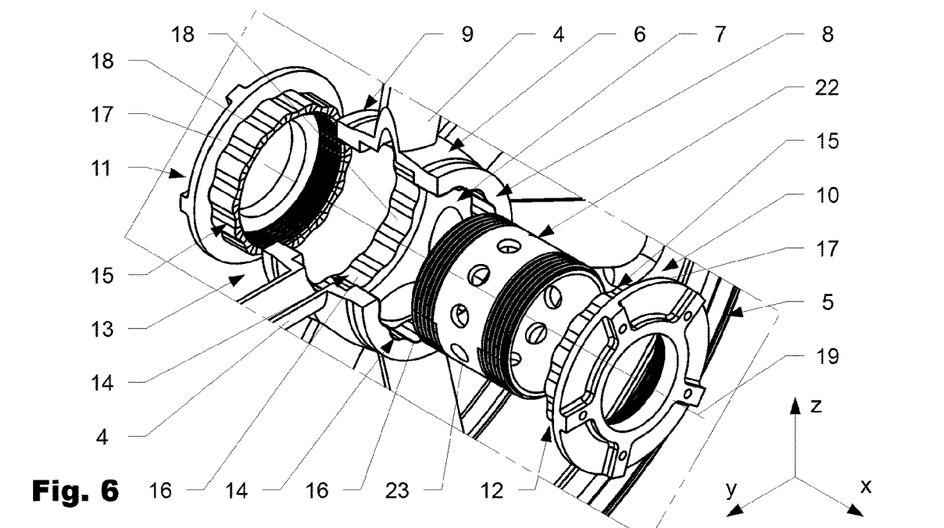
FIG. 6 is a magnified exploded view of the second variation of the wheel shown at detail C of FIG. 5.
Figure 7:
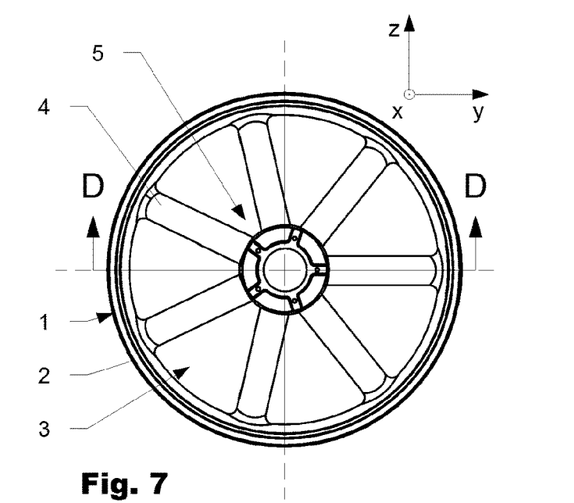
FIG. 7 is a front view of the second variation of the wheel shown in FIG. 5.
Figure 8:
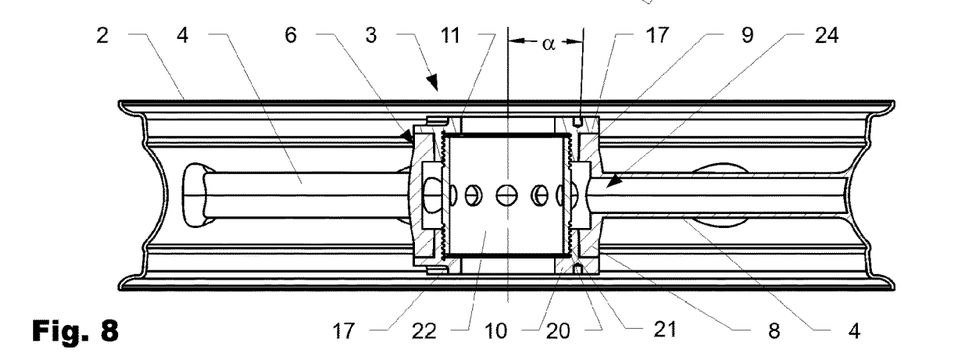
FIG. 8 is a side cross-sectional view along Section D-D shown in FIG. 7.

FIG. 5 is showing a second variation of a wheel 1 according to the invention in a perspective view in a partially cut manner. FIG. 6 is showing detail C of FIG. 5 in a magnified manner. FIG. 7 is showing the wheel 1 in a front view and FIG. 8 is showing section DD of FIG. 7.

Figure 9:
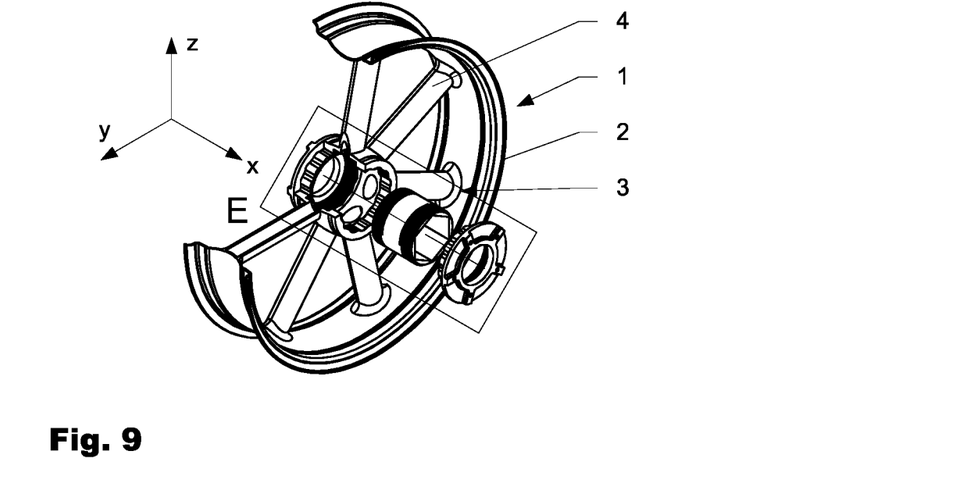
FIG. 9 is a cutaway perspective view of a third variation of a wheel according to the invention.
Figure 10:
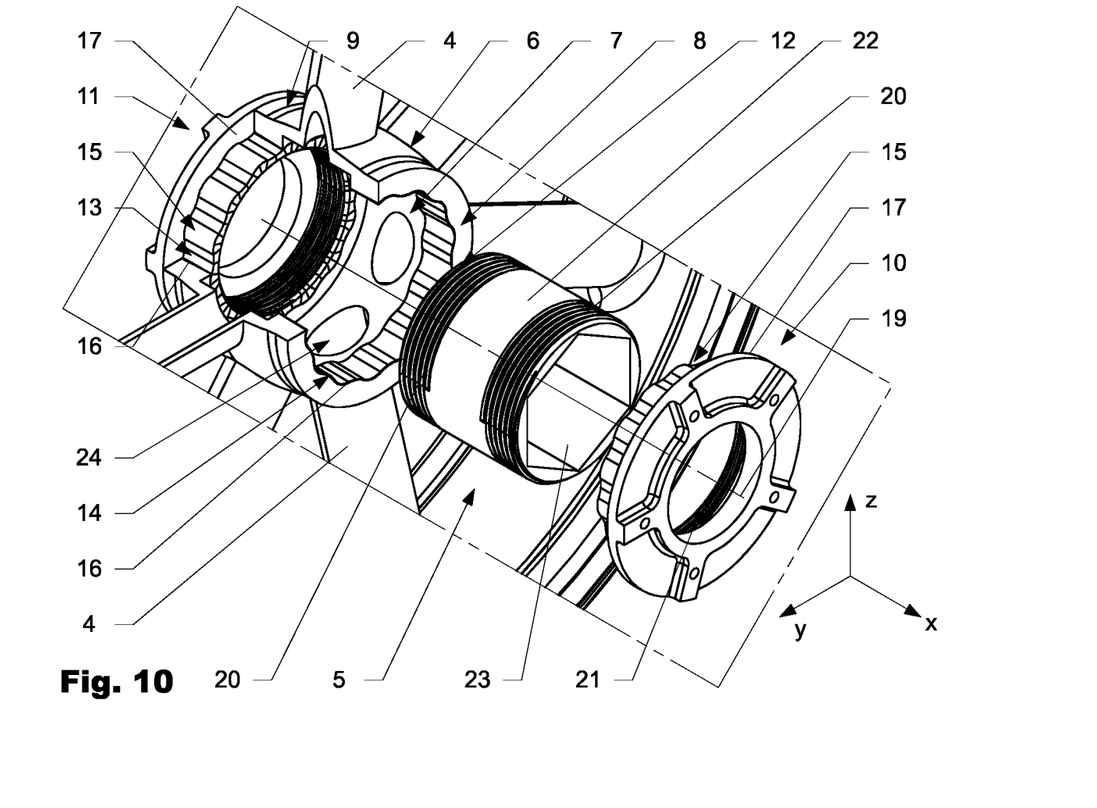
FIG. 10 is a magnified exploded view of the third variation of the wheel shown in detail E of FIG. 9.

FIG. 9 is showing a third variation of a wheel 1 according to the invention in a perspective view in a partially cut manner. FIG. 10 is showing detail E of FIG. 9 in a magnified manner.

Figure 11:
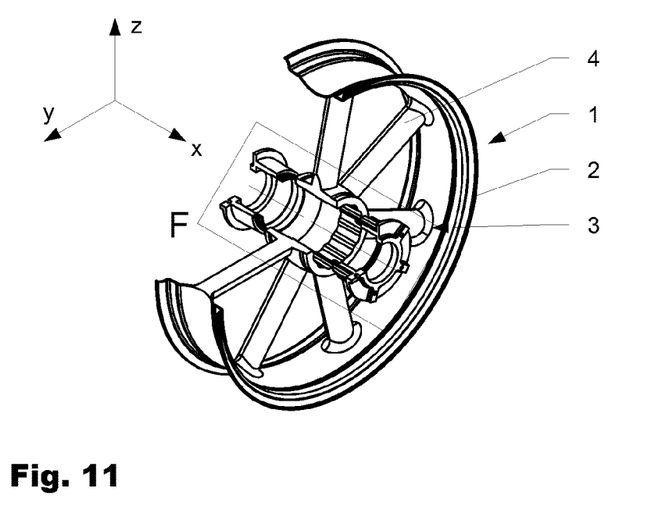
FIG. 11 is a cutaway perspective view of a fourth variation of a wheel according to the invention.
Figure 12:
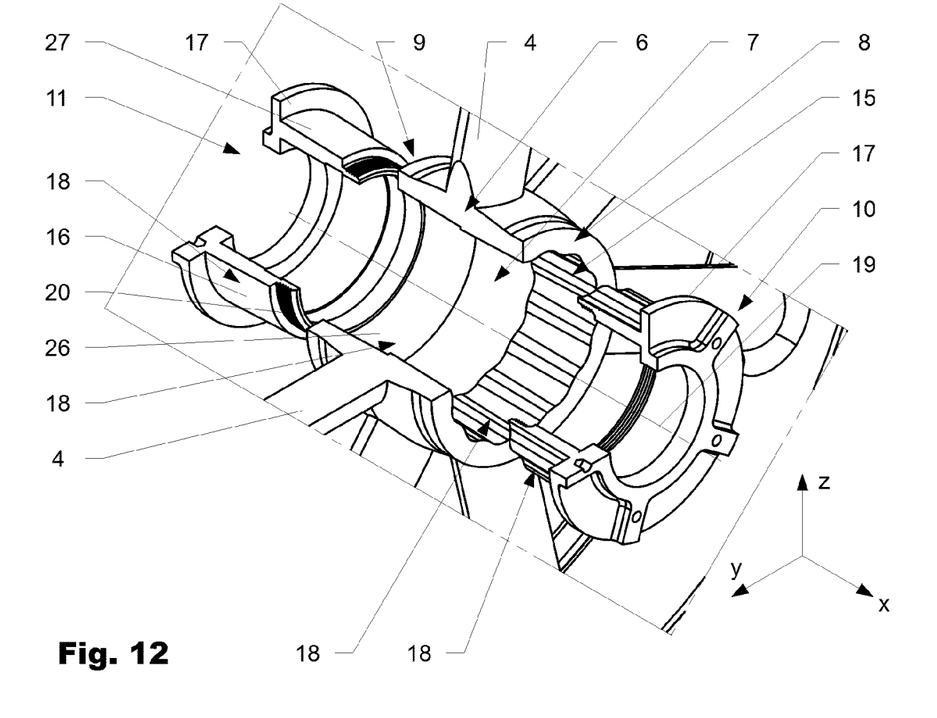
FIG. 12 is a magnified exploded view of the fourth variation of the wheel shown in detail F of FIG. 11.

FIG. 11 is showing a fourth variation of a wheel 1 according to the invention in a perspective view in a partially cut manner. FIG. 12 is showing detail F of FIG. 11 in a magnified manner.

Figure 13:
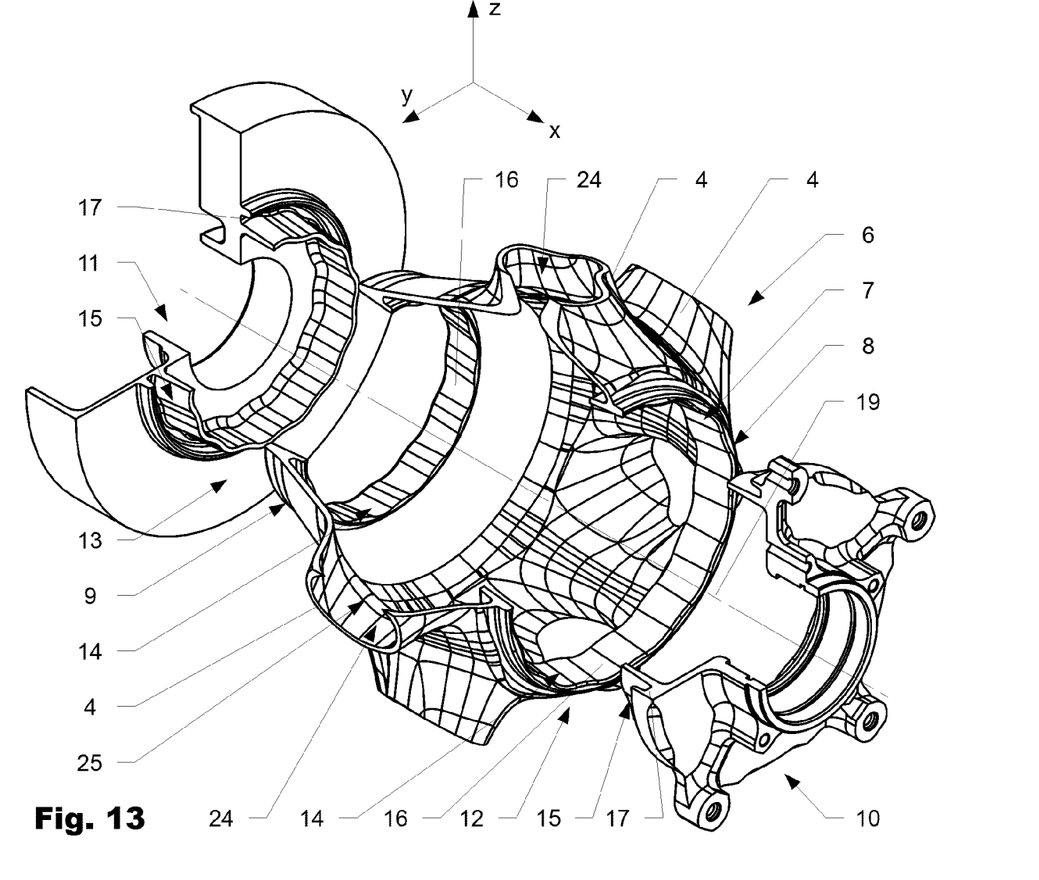
FIG. 13 is a magnified exploded view of a fifth variation of a wheel according to the invention.

FIG. 13 is showing a fifth variation of a wheel 1 according to the invention in a perspective view in a partially cut manner.

Figure 14:
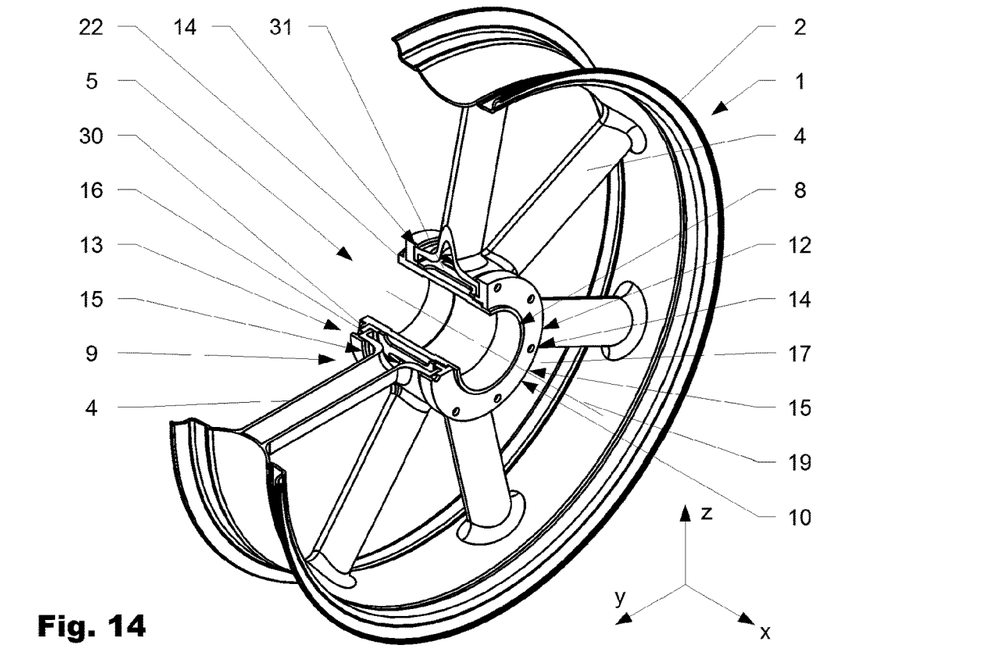
FIG. 14 is a cutaway perspective view of a sixth variation of a wheel according to the invention.
Figure 15:
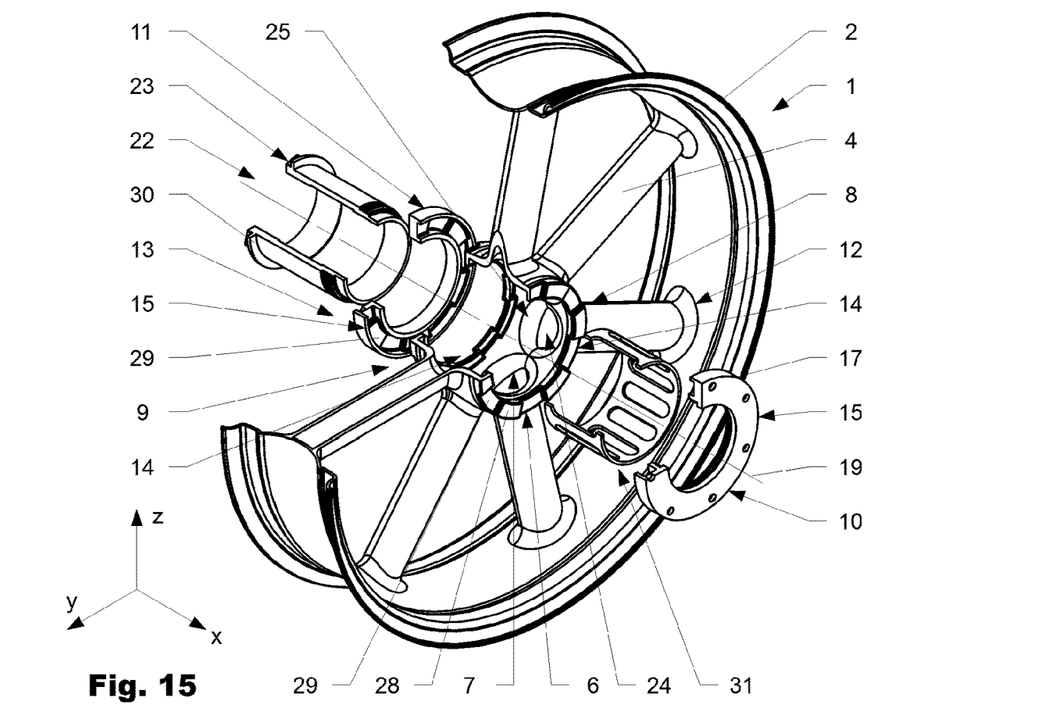
FIG. 15 is an exploded view of a further assembly of the wheel shown in FIG. 14.

FIG. 14 is showing a sixth variation of a wheel 1 according to the invention in a perspective view in a partially cut manner. FIG. 15 is showing the sixth variation of the wheel 1 according to FIG. 14 in a perspective view in a partially cut and exploded manner.

Figure 16:
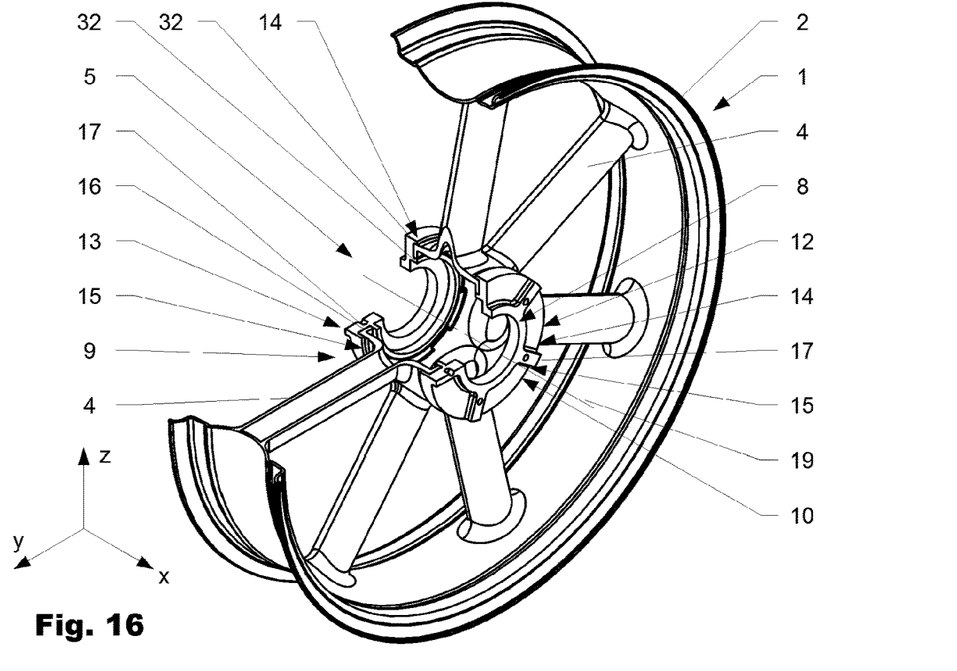
FIG. 16 is a cutaway perspective view of a seventh variation of a wheel according to the invention.
Figure 17:
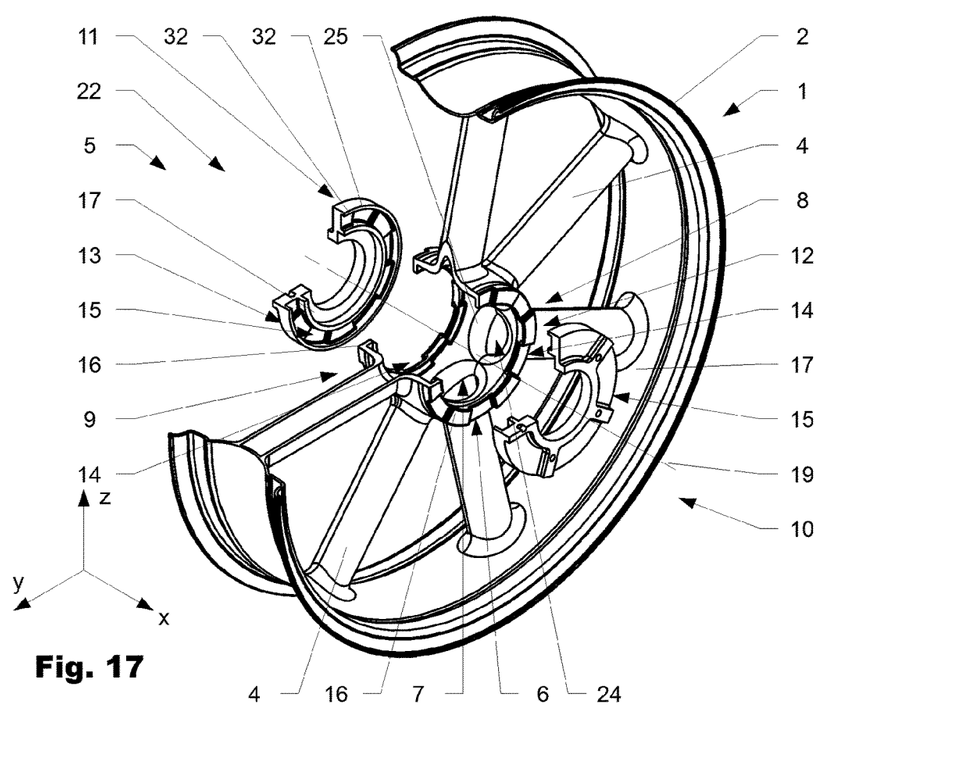
FIG. 17 is an exploded view of a further assembly of the wheel shown in FIG. 16.

FIG. 16 is showing a seventh variation of a wheel 1 according to the invention in a perspective view in a partially cut manner. FIG. 17 is showing the seventh variation of the wheel 1 according to FIG. 16 in a perspective view in a partially cut and exploded manner.

Figure 18:
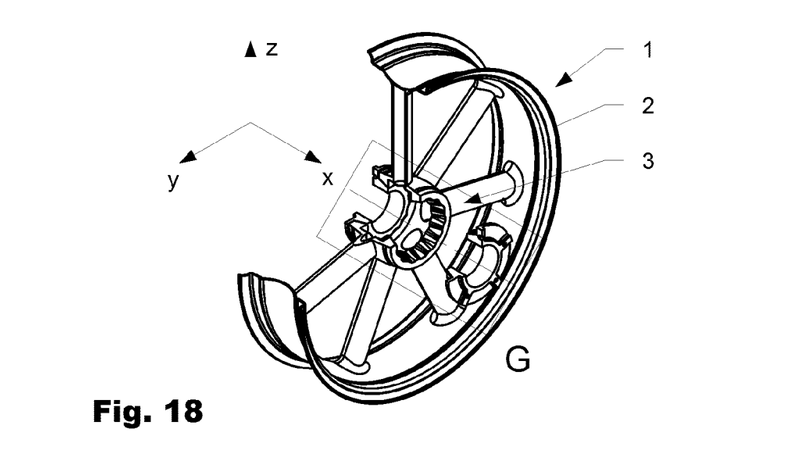
FIG. 18 is a cutaway perspective view of an eighth variation of a wheel according to the invention.
Figure 19:
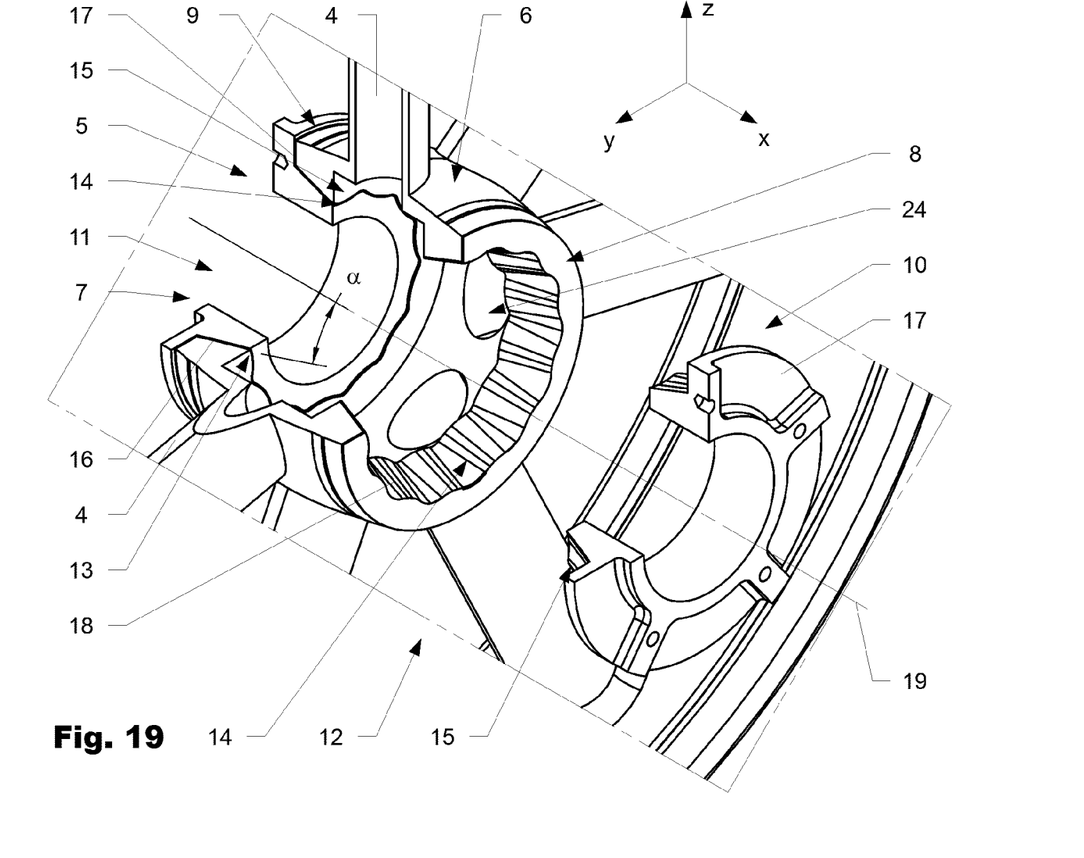
FIG. 19 is a magnified view of Detail G according to FIG. 18.

FIG. 18 is showing an eight variation of a wheel 1 according to the invention in a perspective view in a partially cut manner. FIG. 19 is showing detail G of FIG. 18 in a magnified manner.

A wheel 1 according to the invention normally comprises a rim 2 and a wheel center 3 made from a fiber reinforced composite material. The composite material can either consist of dry reinforcing fibers, which are then embedded, in a resin of a matrix material by resin transfer in a cavity of a closed mold (not shown in detail). The wheel center 3 comprises a tubular middle section 6 having a center opening 7 extending in the direction of a wheel axis 19 and having a first and a second end 8, 9. A hub 5 is arranged at least partially inside of the center opening 7 of the tubular middle section 6. It comprises a first flange ring 10 and a second flange ring 11. At least one of the flange rings 10, 11 and the tubular middle section 6 are interconnected to each other by a form fit interconnection 12, 13 to transfer drive torque between the wheel center 3 and the hub 5.

FIGS. 1, 2, 5, 6, 9 through 13, 15, 17, 18, 19 are showing the hub 5 in an exploded manner disassembled in direction of the wheel axis 19 (x– direction). FIGS. 4 and 8 are showing two variations in an assembled manner. In the variation shown in FIG. 13 a middle section of a wheel center 3 and a hub 5 are shown in a partially cut manner in a perspective view.

The at least one form fit interconnection 12, 13 of at least one flange ring 10, 11 and the tubular middle section 6 may be, as shown in the variations, at least partially be arranged on the inside of the center opening 7. The at least one form fit interconnection 12, 13 is preferably arranged adjacent to at least one end 8, 9 of the center opening 7. The at least one form fit interconnection 12, 13 may comprise a tapered surface 18 extending in the outward direction. Good results can be achieved when the taper angle α of the tapered surface 18 is in the range of 2° to 10° with respect to the wheel axis 19. Depending on the field of application other angles α may be appropriate, as shown in an explanatory manner in the eight embodiment according to FIGS. 18 and 19, where the taper angle α is in the range of 30°. At least one form fit interconnection 12, 13 may comprise at least one first undercut 14 arranged at the tubular middle section 6 interacting in a mounted position with at least one second undercut 15 arranged at a flange ring 10, 11 in circumferential direction with respect to the wheel axis 19. Good transfer of drive torque and failsafe behavior may be achieved when the first and the second undercut forming the form fit interconnection 12, 13 have a sinuous shape corresponding to each other. In another variation the undercuts of the form fit interconnection are having a castellated design as shown in FIGS. 14 through 17 comprising a series of alternating protrusions 28 and thereto corresponding depressions 29 arranged adjacent to at least one end 8, 9 of the center opening 7 of the hub 5 and the first and/or the second flange ring 10, 11. The protrusions 28 and the depressions 29 are extending in direction of the wheel axis 19. In the assembled position as shown in FIGS. 14 and 16 the protrusions 28 and the depressions 29 are interlocked with each other providing good transfer of torque and forces. A further advantage is that the flange rings 10, 11 may be designed to encompass the hub 5 from the outside and/or from the inside by a retaining bead 32 increasing stability.

At least one of the flange rings 10, 11 may be interconnected to the tubular middle section 6 by a layer of adhesive 16. As shown in the drawings, at least one of the flange rings 10, 11 may comprise a shoulder 17 by which the flange ring 10, 11 is in the mounted position supported with respect to the dedicated end 8, 9 of the tubular middle section 6 in the direction of the wheel axis 19. The first and the second flange ring 10, 11 may be interconnected to each other directly or indirectly.

As shown in the variation according to FIGS. 11 and 12 the first and the second flange ring 10, 11 can be directly interconnected to each other by a first and a second thread 20, 21. In this case, only the first flange ring 10 is interconnected to the tubular middle section by a form fit interconnection. On the opposite side the tubular middle section comprises a first surface 26 that in a mounted position interacts with a second surface 27 arranged at the second flange ring 11. The first and the second surfaces 26, 27 are shaped rotation symmetric with respect to the wheel axis 19. Thereby it is possible to fasten the first and the second flange ring 10, 11 with respect to each other.

As shown in the embodiments according to FIGS. 5 through 10 and FIGS. 14 and 15 the first and the second flange ring 10, 11 may be interconnected to each other indirectly by a sleeve 22. As shown in the variations according to FIGS. 5 through 10 the sleeve 22 can be interconnected to at least one flange ring 10, 11 by a first and a second thread 20, 21 arranged on both sides of the sleeve 22. While the first threads 20 are arranged at the sleeve 22, the second threads 21 are arranged at the first and the second flange ring 10, 11. The first threads 20 are having different direction of rotation and the second threads 21 with respect to each other likewise. Thereby it is possible to assemble the hub 5 by rotating the sleeve 22 in a tightening direction of the first and the second threads 20, 21 while the first and the second flange ring 10, 11 are establishing the first and the second form fit interconnection 12, 13 between the first and the second undercuts 14, 15 arranged at the flange rings 10, 11 and the tubular middle section 6. The sleeve 22 may comprises a drive connection 23 to fasten the sleeve 22 to the first and/or the second flange ring 10, 11.

In the variation according to FIGS. 14 and 15 the sleeve 22 in the mounted position as shown in FIG. 14 reaches through the second flange ring 11 and interconnects directly to the first flange ring 10. It comprises a shoulder 30 which lays on the second flange ring 11. If appropriate a support sleeve 31 can be foreseen which supports the first with respect to the second flange ring 10, 11 on the inside.

As visible in the drawings the wheel center comprises spokes 4 that are interconnecting the rim 2 and the tubular middle section 6. The spokes 4 in the shown variations are hollow and communicate with the tubular middle section 6 through a mouth 24. Depending on the design hub 5 may seal the mouths 24 of the hollow spokes 4 with respect to the environment.

A method for making of a wheel 1 as herein described may comprise the following method steps:

(a) Providing at least one auxiliary body (not shown) corresponding at least partially to the inside of at least one hollow spoke 4.

(b) Providing a mold comprising a cavity (both not shown) corresponding at least partially to the outside of the wheel 1.

(c) Applying of reinforcing fibers to the auxiliary body and/or the cavity;

(d) Inserting the at least one auxiliary body and the reinforcing fibers into the cavity of the mold.

(e) Closing the mold and applying and/or curing a matrix material in which the reinforcing fibers are embedded.

(f) Removing the wheel from the mold.

(g) Removing the at least one auxiliary body from the hollow spoke 4 across the mouth 24 through the center opening 7 of the wheel center 3.

In the variation shown in FIG. 13 the crossover between the tubular middle section and the spokes 4 in the area of the mouth 24 is formed by a smooth transition surface (blend) 25. Thereby occurring forces are better distributed and production can be simplified as auxiliary bodies can be removed more easily.

Rather, the words used in the specification are words of description rather than limitation, and it is understood that various changes may be made without departing from the Spirit and scope of the invention.

The invention claimed is:

1. A wheel (1) comprising a rim (2) and a wheel center (3) made from a fiber reinforced composite material, said wheel center (3) comprising:

a. a tubular middle section (6) having a center opening (7) extending in the direction of a wheel axis (19) and having a first and a second end (8, 9) and b. a hub (5) comprising
  i. a first flange ring (10) and
  ii. a second flange ring (11) wherein
c. at least one of the flange rings (10, 11) and the tubular middle section (6) are interconnected to each other by a form fit interconnection (12, 13) comprising at least one tapered surface (18), and wherein
d. the at least one form fit interconnection (12, 13) comprises repeating and spaced apart first undercuts (14) arranged in a circumferential direction at the tubular middle section (6) interacting in a mounted position with corresponding undercuts (15) arranged at at least one of the flange rings (10, 11) in a circumferential direction;
wherein the at least one tapered surface (18) extends at a distance from the rotational axis (19) that is substantially the same as the repeating undercuts (14).

2. The wheel (1) according to claim 1, wherein the at least one form fit interconnection (12, 13) between at least one of the flange rings (10, 11) and the tubular middle section is arranged at least partially on the inside of the center opening (7).

3. The wheel (1) according to claim 2, wherein the at least one form fit interconnection (12, 13) is arranged adjacent to at least one end (8, 9) of the center opening (7).

4. The wheel (1) according to claim 3, wherein the taper angle (α) of the tapered surface (18) is in the range of 2° to 10° with respect to the wheel axis (19).

5. The wheel (1) according to claim 1, wherein the first and the second undercuts include a sinuous shape corresponding to each other.

6. The wheel (1) according to claim 1, wherein the first and the second undercuts include a castellated design comprising a series of alternating protrusions (28) and thereto corresponding depressions (29) arranged at the hub (5) and the first and/or the second flange rings (10, 11).

7. The wheel (1) according to claim 1, wherein at least one of the flange rings (10, 11) is interconnected to the tubular middle section (6) by a layer of adhesive (16).

8. The wheel (1) according to claim 1, wherein at least one of the flange rings (10, 11) comprises a shoulder (17) by which the flange ring (10, 11) is supported with respect to the respective end (8, 9) of the tubular middle section (6) in the direction of the wheel axis (19).

9. The wheel (1) according to claim 1, wherein the first and the second flange ring (10, 11) are directly or indirectly interconnected to each other.

10. The wheel (1) according to claim 9, wherein the first and the second flange ring (10, 11) are directly interconnected with respect to each other by a first and a second thread (20, 21).

11. The wheel (1) according to claim 9, wherein the first and the second flange ring (10, 11) are interconnected to each other by a sleeve (22).

12. The wheel (1) according to claim 11, wherein the sleeve (22) is interconnected to at least one flange ring (10, 11) by a first and a second thread (20, 21).

13. The wheel (1) according to claim 12, wherein the sleeve (22) comprises a drive connection (23) to fasten the sleeve (22) with respect to the first and/or the second flange ring (10, 11).

14. The wheel (1) according to claim 1, wherein the wheel center comprises spokes (4) interconnecting the rim (2) and the tubular middle section (6), wherein the spokes (4) are hollow and communicate with the tubular middle section (6) through a mouth (24).

15. The wheel (1) according to claim 14, wherein the hub (5) seals mouths (24) of the hollow spokes (4) with respect to the environment.

16. The wheel (1) according to claim 1, wherein the second undercuts (15) extend from a shoulder (17) of the flange rings (10, 11) to an end face of the flange rings (10, 11).

17. The wheel (1) according to claim 1, wherein an engagement of the undercuts (14, 15) prevents rotation of the flange rings (10, 11) relative to the tubular middle section (6).

* * * * *